United States Patent
Wild et al.

(10) Patent No.: US 10,592,078 B2
(45) Date of Patent: Mar. 17, 2020

(54) METHOD AND DEVICE FOR A GRAPHICAL USER INTERFACE IN A VEHICLE WITH A DISPLAY THAT ADAPTS TO THE RELATIVE POSITION AND OPERATING INTENTION OF THE USER

(71) Applicant: VOLKSWAGEN AG, Wolfsburg (DE)

(72) Inventors: Holger Wild, Berlin (DE); Mark Peter Czelnik, Wolfsburg (DE)

(73) Assignee: VOLKSWAGEN AG, Wolfsburg (DE)

( * ) Notice: Subject to any disclaimer, the term of this patent is extended or adjusted under 35 U.S.C. 154(b) by 183 days.

(21) Appl. No.: 15/126,268

(22) PCT Filed: Feb. 20, 2015

(86) PCT No.: PCT/EP2015/053605
§ 371 (c)(1),
(2) Date: Sep. 14, 2016

(87) PCT Pub. No.: WO2015/135737
PCT Pub. Date: Sep. 17, 2015

(65) Prior Publication Data
US 2017/0083216 A1    Mar. 23, 2017

(30) Foreign Application Priority Data
Mar. 14, 2014   (DE) .................. 10 2014 204 800

(51) Int. Cl.
*G06F 3/0484*    (2013.01)
*G06F 3/03*    (2006.01)
(Continued)

(52) U.S. Cl.
CPC .......... *G06F 3/04845* (2013.01); *G06F 3/013* (2013.01); *G06F 3/0304* (2013.01);
(Continued)

(58) Field of Classification Search
CPC .. G06F 3/048; G06F 3/04845; G06F 3/04847; G06F 3/04855; G06F 3/0421;
(Continued)

(56) References Cited

U.S. PATENT DOCUMENTS 6,204,846 B1 *  3/2001  Little ................. G06F 3/04855
                                                            715/784
8,115,811 B2 *  2/2012  Hiramaki ................. B60R 1/00
                                                            348/148
(Continued)

FOREIGN PATENT DOCUMENTS

CN    102470757 A    5/2012
DE    101 31 720     1/2003
(Continued)

OTHER PUBLICATIONS

Bachfischer et. al., "Eye Gaze and Movement Behaviour in the Operation of Adaptive In-Car Touchscreens," Sep. 5, 2008, IEEE Xplore, 2008 IEEE Intelligent Vehicles Symposium, DOI 10.1109/IVS.2008.4621138, Retrieved on May 25, 2018 (PDF Attached).*
(Continued)

*Primary Examiner* — Kieu D Vu
*Assistant Examiner* — Rami R Okasha
(74) *Attorney, Agent, or Firm* — Hunton Andrews Kurth LLP (57) ABSTRACT

In a method for supplying a graphical user interface in a vehicle, at least one object for representing a first subset of total information is graphically displayed on a display area in at least one first display mode. An operating intention of a user is detected. In addition, a relative position of the user with respect to the display area is ascertained. When the operating intention of the user has been detected, the object is transferred into a second display mode, in which the object is displayed perspectively or three-dimensionally
(Continued)

pivoted about an axis at a pivoting angle in the direction of the relative position. In addition, a device is adapted for providing a graphical user interface.

13 Claims, 8 Drawing Sheets

(51) Int. Cl.
| | |
|---|---|
| G06F 3/042 | (2006.01) |
| G06F 3/01 | (2006.01) |
| G06F 3/0488 | (2013.01) |
| B60K 37/06 | (2006.01) |
| B60K 35/00 | (2006.01) |

(52) U.S. Cl.
CPC ........ *G06F 3/0421* (2013.01); *G06F 3/04847* (2013.01); *G06F 3/04883* (2013.01); *B60K 35/00* (2013.01); *B60K 37/06* (2013.01); *B60K 2370/12* (2019.05); *B60K 2370/141* (2019.05); *B60K 2370/146* (2019.05); *B60K 2370/1464* (2019.05); *B60K 2370/18* (2019.05); *B60K 2370/52* (2019.05); *B60K 2370/73* (2019.05); *G06F 2203/04803* (2013.01)

(58) Field of Classification Search
CPC ......... G06F 3/0304; G06F 2203/04803; G06F 3/04886; G06F 3/013; G06F 3/017; B60K 2350/1012; B60K 2350/2017; B60K 2350/352; B60K 2350/903; B60K 2350/96; B60K 2350/965; B60K 2350/90; B60K 2350/901
See application file for complete search history.

(56) References Cited

U.S. PATENT DOCUMENTS

| | | | | |
|---|---|---|---|---|
| 9,317,106 | B2* | 4/2016 | Su | G06F 3/005 |
| 2004/0178894 | A1 | 9/2004 | Janssen | |
| 2008/0079753 | A1 | 4/2008 | Victor et al. | |
| 2009/0040196 | A1 | 2/2009 | Duckstein et al. | |
| 2010/0131904 | A1* | 5/2010 | Fong | G06F 3/0346 |
| | | | | 715/863 |
| 2010/0149072 | A1* | 6/2010 | Waeller | B60K 35/00 |
| | | | | 345/7 |
| 2011/0187749 | A1 | 8/2011 | Dehmann et al. | |
| 2011/0261051 | A1* | 10/2011 | Meyer | B60K 35/00 |
| | | | | 345/419 |
| 2012/0068956 | A1* | 3/2012 | Jira | B60K 37/06 |
| | | | | 345/174 |
| 2012/0235901 | A1* | 9/2012 | Binder | G01S 3/7864 |
| | | | | 345/156 |
| 2012/0274549 | A1* | 11/2012 | Wehling | B60K 35/00 |
| | | | | 345/156 |
| 2012/0314899 | A1* | 12/2012 | Cohen | G06F 3/012 |
| | | | | 382/103 |
| 2013/0047112 | A1* | 2/2013 | Waller | B60H 1/00985 |
| | | | | 715/771 |
| 2013/0067407 | A1* | 3/2013 | Dehmann | B60K 35/00 |
| | | | | 715/810 |
| 2013/0201303 | A1* | 8/2013 | Shimotani | G01C 21/365 |
| | | | | 348/51 |
| 2014/0285641 | A1* | 9/2014 | Kato | G06F 3/013 |
| | | | | 348/54 |
| 2014/0320614 | A1* | 10/2014 | Gaudreau | G02B 27/2214 |
| | | | | 348/51 |
| 2015/0067582 | A1* | 3/2015 | Donnelly | G06F 3/0485 |
| | | | | 715/784 |
| 2015/0109204 | A1* | 4/2015 | Li | G06F 3/011 |
| | | | | 345/156 |
| 2015/0116197 | A1* | 4/2015 | Hamelink | G06F 3/013 |
| | | | | 345/156 |
| 2015/0314682 | A1* | 11/2015 | Enriquez Ortiz | B60K 35/00 |
| | | | | 701/49 |

FOREIGN PATENT DOCUMENTS

| | | |
|---|---|---|
| DE | 103 39 314 | 4/2005 |
| DE | 10 2004 048 956 | 4/2006 |
| DE | 10 2008 034 507 | 1/2010 |
| DE | 10 2008 048 820 | 3/2010 |
| DE | 10 2008 050 803 | 4/2010 |
| DE | 10 2009 023 897 | 12/2010 |
| DE | 10 2009 046 451 | 5/2011 |
| EP | 2 246 214 | 11/2010 |

OTHER PUBLICATIONS

Cheng et. al., "Vision-Based Infotainment User Determination by Hand Recognition for Driver Assistance," May 24, 2010, IEEE Transactions on Intelligent Transportation Systems, vol. 11, Issue 3, DOI 10.1109/TITS.2010.2049354 , Retrieved on May 25, 2018 (PDF Attached).*

International Search Report, dated May 21, 2015, issued in corresponding International Application No. PCT/EP2015/053605 (English-language translation).

Office Action issued in Chinese Patent Application No. 201580013492.0, dated Dec. 5, 2018, pp. 1-12 (English translation provided).

* cited by examiner

METHOD AND DEVICE FOR A GRAPHICAL USER INTERFACE IN A VEHICLE WITH A DISPLAY THAT ADAPTS TO THE RELATIVE POSITION AND OPERATING INTENTION OF THE USER

FIELD OF THE INVENTION

The present invention relates to a method and a device for providing a graphical user interface in a vehicle.

BACKGROUND INFORMATION

The increase in electronic devices in the vehicle has made it necessary to display larger quantities of information inside the vehicle. Modern vehicles, for example, are equipped with a plurality of driver assistance systems, for which information must be displayed in the vehicle. In addition, vehicles frequently include a navigation system. Such a navigation system is able to display digital geographic road maps together with a route and possibly a wide variety of supplementary information. Finally, modern vehicles often come equipped with communication and multimedia applications, including a mobile telephone interface and devices for music and voice playback. Information for these applications must likewise be displayable inside the vehicle.

Multi-function operating systems are therefore used in vehicles, which encompass one or more multi-function display(s) as well as operating elements, by which the many different devices installed in the vehicle can be operated. The information reproduced on the multifunction display assists in or controls the operation. In addition, the operating system can be used for selecting which particular information is to be displayed on the multifunction display.

German Published Patent Application No. 10 2008 050 803 describes a method for the display of information in a vehicle, in which a subset of the total quantity of the overall information is able to be controlled via image scrolling.

European Published Patent Application No. 2 246 214 describes a method for the display of information sorted in the form of lists. Selected list entries can be shown in the foreground, while list entries not selected are displayed in the background.

In a vehicle, information is often displayed by displaying a subset of the total information on the display area inside the vehicle, the user being able to change the subset. The total information may be a list that contains a multitude of list entries, for example. A subset of the list entries of the complete list is displayed. With the aid of an operating action, the user is able to induce image scrolling in order to have other list entries displayed. In the operating action, the user may execute an operating motion of a certain length, for instance. The user may also operate an operating element for a certain operating period, for instance. The extent, or the measure, of the change in the displayed information, in this instance, the number of positions by which the displayed list entries change, is a function of the duration of the operating motion or the operating length.

If multiple users are seated inside the vehicle, they gaze at the display area from different positions. This is problematic insofar as a display of the information in an operation that may be optimal for the passenger, for instance, is not always optimal for the driver.

SUMMARY

Example embodiments of the present invention provide a method and a device by which a subset of a total information quantity can be displayed for each vehicle passenger individually, in an intuitive and rapid manner.

In the method according to an example embodiment of the present invention, at least one object for the representation of a first subset of a total information quantity is graphically displayed on a display area in at least one first display mode. The operating intention of a user is detected as well, and the relative position of the user in relation to the display area is ascertained. Once the operating intention has been detected, the object is transferred into a second display mode, in which the object is shown in a perspective or three-dimensional view, pivoted about an axis at a pivoting angle in the direction of the relative position.

For example, the object may be a two-dimensional object, which is shown in a plan view in the first display mode. In this case the object may completely fill the display or a sub-region of the display. In the transition from the first display mode to the second display mode, the object, for instance, is pivoted perspectively, so that it may happen that the area taken up by the object on the display actually becomes smaller, but the parts of the object that are perspectively shown in the rear are reduced in their absolute size on the display, so that, as a whole, a larger subset of the total information is displayed in a manner that the viewer can comprehend very quickly and intuitively. Because, similar to a real object such as a map of the size of the display, the perspective representation makes it possible to view a larger map through a cut-away the size of the display when it is pivoted about an axis toward the back. It is therefore also possible to accommodate a larger subset of the total information on this larger map, which is able to be viewed through the cut-away of the display.

The three-dimensional pivoting of the object can be displayed autostereoscopically. In contrast to the perspective representation, one eye of the viewer in this case sees a slightly different image than the other eye, so that a real three-dimensional display is achieved. An autostereoscopic display requires no special devices such as glasses or the like to produce the three-dimensional effect when looking at the display.

The maximum pivoting angle in particular lies within a range of 35° to 55°, because if the maximum pivoting angle becomes too large, then the projection of an object displayed perspectively or three-dimensionally onto the display area will be too small to allow the displayed subset of the total information to still be discernible.

It may be provided that a viewing angle under which the user gazes at the display area from the relative position is ascertained. The viewing angle is subdivided into a horizontal and a vertical component. The horizontal component includes an angle component of the viewing angle by which the gaze direction of the user deviates to the left and right from a vertical plane that is situated in the vehicle longitudinal direction; and the vertical component includes an angle component of the viewing angle by which the gaze direction of the user deviates in the upward and downward direction from a plane that is situated horizontally in the vehicle longitudinal direction. The pivoting angle of the object in the second display mode then is a function of the horizontal and/or vertical component of the viewing angle. This advantageously makes it possible to pivot the object in the direction of the user's position without having to pivot an entire display device. The pivoting of the object as a function of the user's viewing angle then results in an optimal view of the object from virtually any seating position of the user in the vehicle during the operation.

In particular, the axis about which the object is pivoted extends substantially horizontally or substantially vertically through the object. The object, in particular, may also be pivoted about the horizontal and the vertical axis. It is then advantageously possible to simultaneously consider the horizontal and vertical component of the viewing angle in the pivoting angle. More specifically, the pivoting angle of the object can then be adjusted to the head and/or eye position of the user.

It is ascertained, in particular, whether a first or a second user has the operating intention, a first relative position being ascertained for the first user, and a second relative position for the second user. This makes it possible to distinguish between the driver and the passenger, in particular. In an uncomplicated manner, the object may then simply be pivoted in the direction of the driver or the passenger. The pivoting angle of the object in the direction of the first relative position in particular may be of exactly the same size as the pivoting angle in the direction of the second relative position.

An approach of an operating object on the part of the user in the direction of the display area is advantageously detected as an operating intention. The object then already transitions to the second display mode when the user approaches the display area with an operating object such as his hand.

A second subset of the total information may be displayed adjacent to the first subset of the total information in the second display mode. The user will then already be shown which display content may be displayed to him next as soon as his hand approaches the display area. This allows an especially rapid and, above all, intuitive operation of the graphical user interface.

In the second display mode, in particular, a second subset of the total information abuts the first subset of the total information perspectively or three-dimensionally in the front and/or in the back. In this manner the first subset of the total information is arranged within the total quantity of the total information.

The total information is represented in the form of graphical objects, in particular, and each item of information of the total information is assigned one graphical object. In the first display mode, fewer graphical objects are shown than in the second display mode. The transition from the first display mode to the second display mode thus provides the user with a comprehensive preview of further graphical objects. In this case, the change in the displayed subset of the total information corresponds to image scrolling or to scrolling through the graphical objects. For the operating process of scrolling through the graphical objects, the graphical objects are thus displayed on the perspectively or three-dimensionally pivoted object on which a larger number of graphical objects is displayed. This allows the user to scroll through the total quantity of the total information more rapidly.

In addition, the first subset of the total information is shown in highlighted form in comparison with the second subset of the total information in the second display mode. The first subset of the total information, in particular, may be shown in color while the second subset of the total information will be displayed in gray.

In the second display mode, the first subset of the total information may be shown in a region on the display area that is delimited by a first boundary and a second boundary, the first subset of the total information being shown in highlighted form in comparison with the second subset of the total information. The position of the first subset of the total information and the second subset of the total information is shifted on the display area through an operating action of the user; a first portion of the first subset is shifted out of the region while a second portion of the second subset is shifted into the region, so that the first portion will no longer be displayed in highlighted form and the second portion is shown in highlighted form. The operating action, in particular, may be a gesture of the user, such as a wiping gesture. The user is able to use the gesture to define the direction in which the total information will be shifted. The operating action of the user produces image scrolling, in particular.

Shown in the area, in particular, is the information that is displayed on the display area at the end of the operating action in the first display mode and which thus forms a new first subset of the total information. The user can thereby already see in the second display mode which information will be displayed to him in the first display mode.

A bar having a marker is preferably displayed. The bar represents the quantity of the total information, and the position of the marker on the bar is shifted as a function of the operating action, the position of the marker on the bar representing the position of the subset of the total information within the quantity of the total information. More specifically, the bar with the marker constitutes what is referred to as a scroll bar. A length of the marker, in particular, indicates the size of the quantity of the total information. The shorter the marker, the greater the total quantity.

Example embodiments of the present invention relate to a device for providing a graphical user interface. The device includes a display area for the graphical display of at least one object for the representation of a first subset of total information. In addition, the device includes a detection device, by which an operating intention of a user is detectable, and an ascertainment unit, by which a relative position of the user in relation to the display area is ascertainable. The device finally includes a control unit, with the aid of which graphical data can be generated that represent the object in a first display mode, and by which the object can be transferred into a second display mode. In the second display mode, the object is displayable pivoted about an axis at a pivoting angle in the direction of the relative position when the operating intention has been detected. The device, in particular, is suitable for executing the method described herein and therefore offers all of the advantages of the method.

The device, in particular, may carry out the afore-described method steps either partially or completely.

The detection device may include a proximity detection device, by which an approach of an operating object toward the display area can be detected. The operating intention can then already be detected when the operating object enters a detection space formed in front of the display area, for example.

In particular, the detection device may be used for detecting a viewing angle under which the user gazes at the display area from the direction of the relative position. The detection device, in particular, may subdivide the viewing angle into a horizontal and a vertical component, which advantageously makes it possible to generate a very individualized display for the object on the display area.

In addition, the ascertainment unit may be used for detecting whether a first or a second user has the operating intention, a first relative position being allocated to the first user, and a second relative position to the second user.

The detection device moreover may include a touch-sensitive surface which is situated on the display area.

Further operating actions are therefore able to be executed by touching the display area. The display area then provides a touch-sensitive screen.

In addition, example embodiments of the present invention provide a vehicle that includes the device described herein.

In the following text, example embodiments of the present invention will be explained with reference to the drawing.

DETAILED DESCRIPTION

Figure 2:
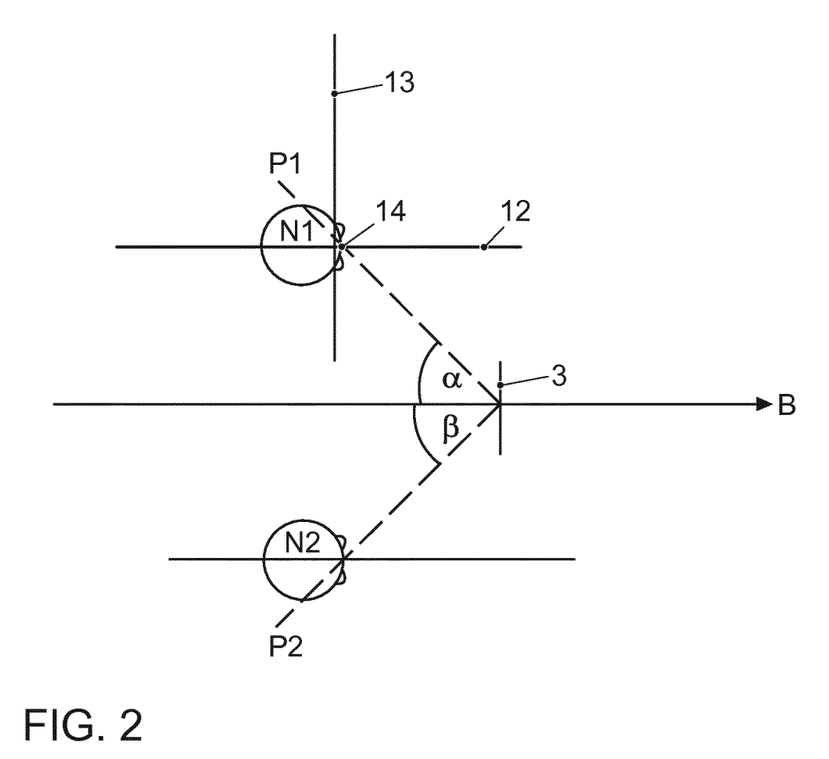
FIG. 2 schematically shows a view from above into the vehicle interior.
Figure 3:
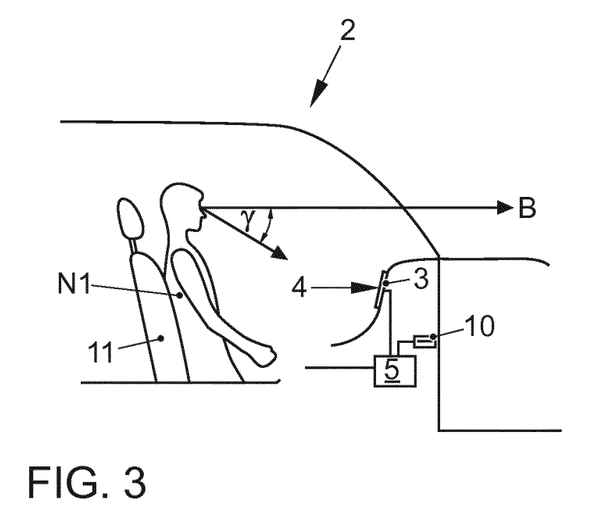
FIG. 3 shows a placement of the device inside a vehicle.

A device 1 according to an example embodiment of the present invention and a placement of device 1 in a vehicle 2 will be explained with reference to FIGS. 1, 2 and 3.

Device 1 is used for providing a user interface in a vehicle 2. It includes a display device 3 having a display area 4. Display area 4 may be made available by a display of any type. Display device 3 is connected to a control unit 5, which generates graphical data that are visibly reproduced for the vehicle passengers via display area 4 in the interior of vehicle 2. Operating objects and display objects, in particular, are able to be shown for the user interface. These operating and display objects assist user N1 in controlling devices of the vehicle. The display objects provide information in addition.

Furthermore, a proximity detection device 6 is provided, by which an approach of an operating object 7, such as a hand of a user N1, toward display area 4 is able to be detected in a detection space 8. Detection space 8 is situated in front of display area 4. Proximity detection device 6 is part of an input device for the user interface. User N1 may execute gestures in detection space 8 in order to control the display on display area 4.

Proximity detection device 6, for example, may include infrared-light sources and infrared-light detectors. As an alternative, proximity detection device 6 may be equipped with an optical system including a camera, which records the gesture executed in detection space 8. In addition, the optical system could encompass a light-emitting diode, which, for instance, emits rectangular wave, amplitude-modulated light. This light is reflected at the hand of user N1 executing the gesture in detection space 8 and reaches a photodiode of proximity detection device 6 after being reflected. An additional light-emitting diode emits rectangular wave, amplitude-modulated light to the photodiode as well, which is phase-shifted by 180°, however. The two light signals superpose at the photodiode and cancel each other out if they have exactly the same amplitude. In the event that the signals do not cancel each other out at the photodiode, a control loop regulates the light emission of the second diode such that the total received signal adds up to zero again. If there is a change in position of the hand of user N1 in detection space 8, the light component that arrives at the photodiode from the first light-emitting diode via the reflection at the hand will change as well. This induces the control loop to adapt the intensity of the second light-emitting diode, which therefore means that the control signal is a measure of the reflection of the light emitted by the first diode at the hand of user N1 executing the gesture. A signal that is characteristic of the position of the hand of user N1 can thereby be derived from the control circuit.

In addition, device 1 includes an ascertainment device 9, which can detect whether the operating intention in detection space 8 is executed by a first user N1 or a second user N2. First user N1 is the driver of vehicle 2, in particular, and second user N2, in particular, is the passenger. Moreover, ascertainment device 9 is able to determine a first relative position P1 of first user N1 with regard to display area 4, and a second relative position P2 of second user N2 with regard to display area 4.

The ascertainment of the relative position of a user with regard to display area 4 will be explained by way of example using relative position P1 of first user N1; however, relative position P2 of second user N2 is ascertained in an analogous manner.

Figure 1:
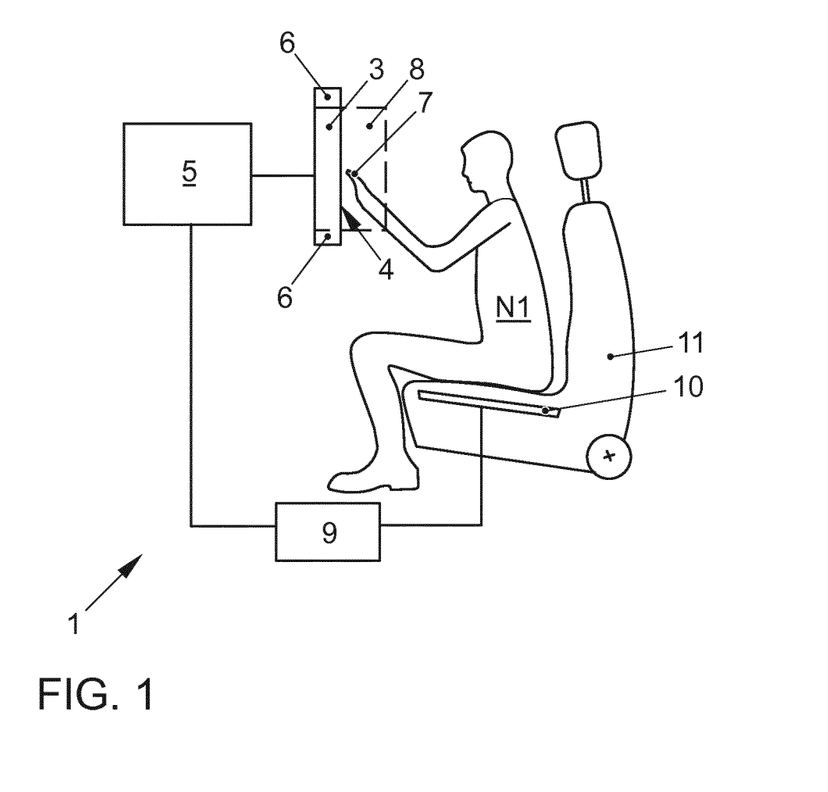
FIG. 1 shows a device according to an exemplary embodiment of the present invention.

As illustrated in FIG. 1, an electrode array 10 is located in seat 11 of first user N1. This electrode device 10 may be used for capacitively coupling an identification code into the body of first user N1. The identification code is able to identify relative position P1 of first user N1 with regard to display area 4, the seating position of first user N1, and also first user N1 himself. The identification code is transmitted via the body of first user N1 and capacitively decoupled at the fingertip of first user N1, so that it can be transmitted to a receiving device accommodated in display device 3.

The receiving device is connected to a control unit 5, which in turn is capacitively coupled to electrode device 10. An electric field having a very limited range of several centimeters or decimeters, for example, is used in the capacitive couplings between electrode device 10 and first user N1, for one, and first user N1 and the receiving device in display device 3, for another. The range of this field substantially corresponds to the size of detection space 8. Relatively low carrier frequencies of several 100 kHz, which lead to quasi-static fields, are employed for the signal transmission, i.e. fields for which the physical principles that apply to static fields are true for the most part. As far as further details of this signal transmission are concerned, reference is made to German Published Patent Application No. 10 2004 048 956 and the additional literature cited therein, which is hereby incorporated into the present application by reference. The circuit devices used in German Published Patent Application No. 10 2004 048 956, in particular, may be used.

The manner in which a viewing angle of first N1 and/or of second user N2 in relation to display area 4 is able to be ascertained will be explained with reference to FIGS. 2 and 3.

Once again, this will be done by way of example for first user N1, but takes place in a similar manner for user N2.

When an operating intention exists, the head and/or eye position of first user N1 is detected to begin with and then compared to a reference image. The reference image may be an image of first user N1 himself, in which case the image then includes the head and/or eye position of first user N1 when gazing at the road. This makes it possible to determine how the head and/or eye position of first user N1 changes when the user gazes at display area 4. As an alternative, the reference image may also be a pattern image.

A deviation to the left or right of the head and/or eye position of first user N1 from a vertical plane 12 extending in parallel with vehicle longitudinal direction B will then be ascertained. Vertical plane 12 intersects center point 14 between the eyes of first user N1, in particular. In this case, the head and/or eye position describes especially the rotation of the head about an axis that lies in plane 12.

A vertical component $\gamma$ is ascertained via an upward or downward deviation of the head and/or eye position of first user N1 from a horizontal plane 13 which is situated at a right angle to vertical plane 12. Horizontal plane 13, in particular, intersects the eyes of first user N1. In this case, the head and/or eye position describes the rotation of the head about an axis that lies in plane 13, in particular.

Figure 5:
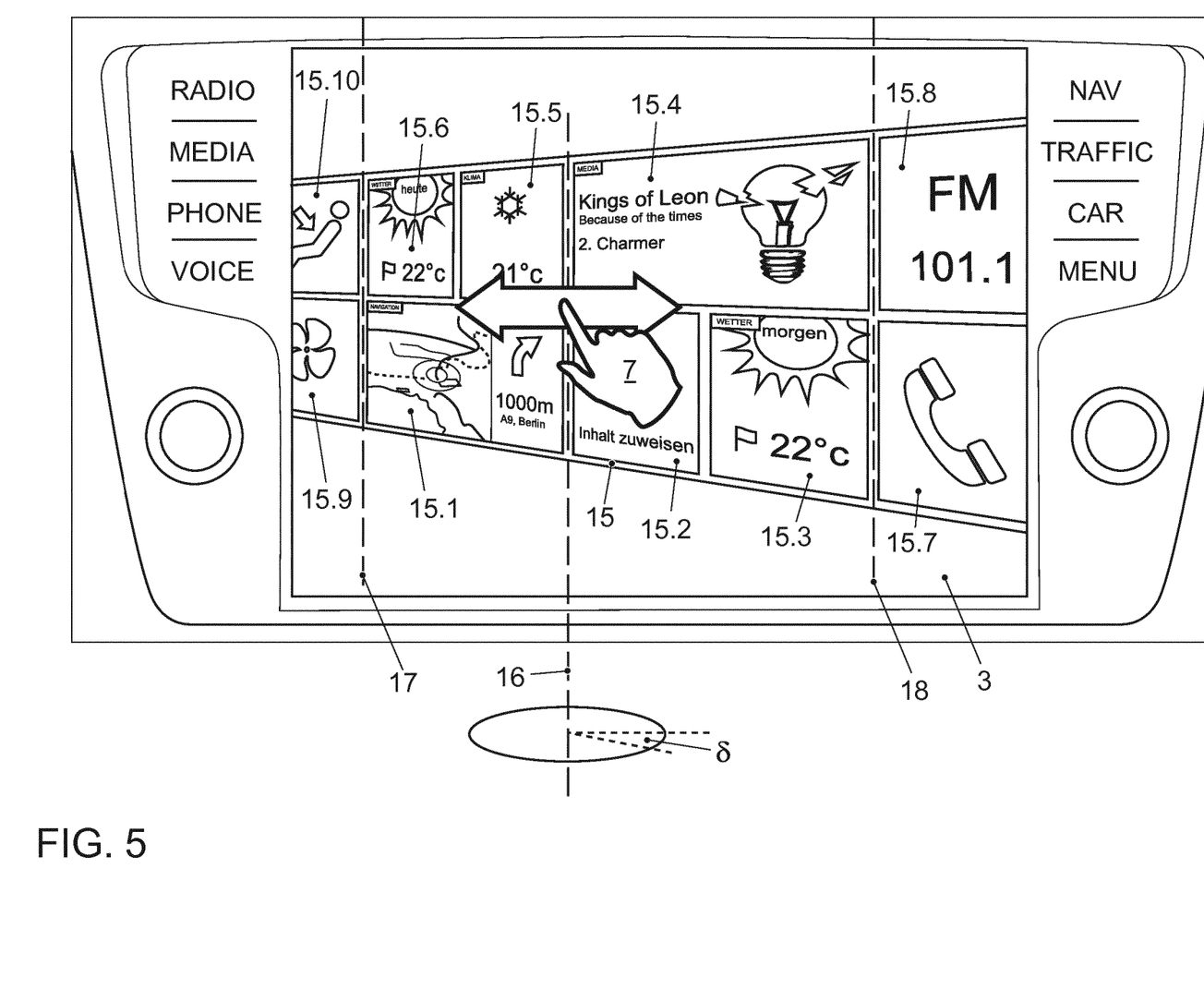
Figure 6:
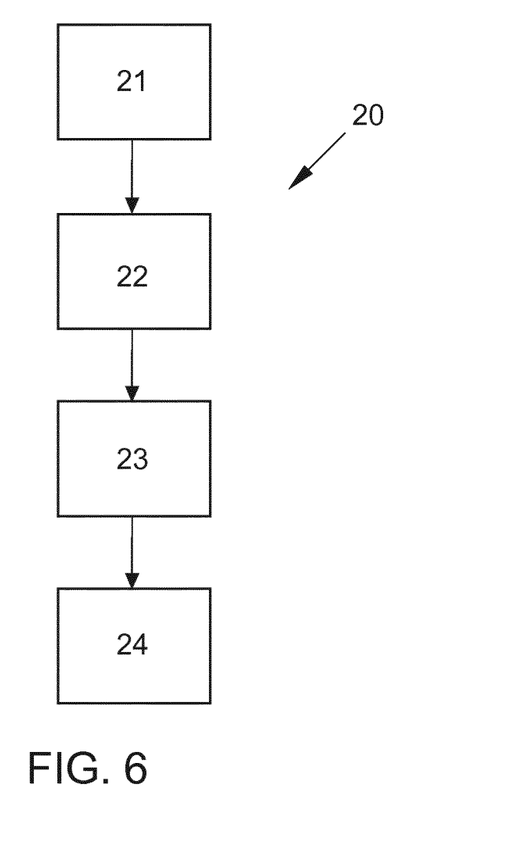
FIG. 6 shows a flow chart for a first exemplary embodiment of the method.

The method according to an example embodiment of the present invention will be described with reference to FIGS. 4 through 6.

Figure 4:
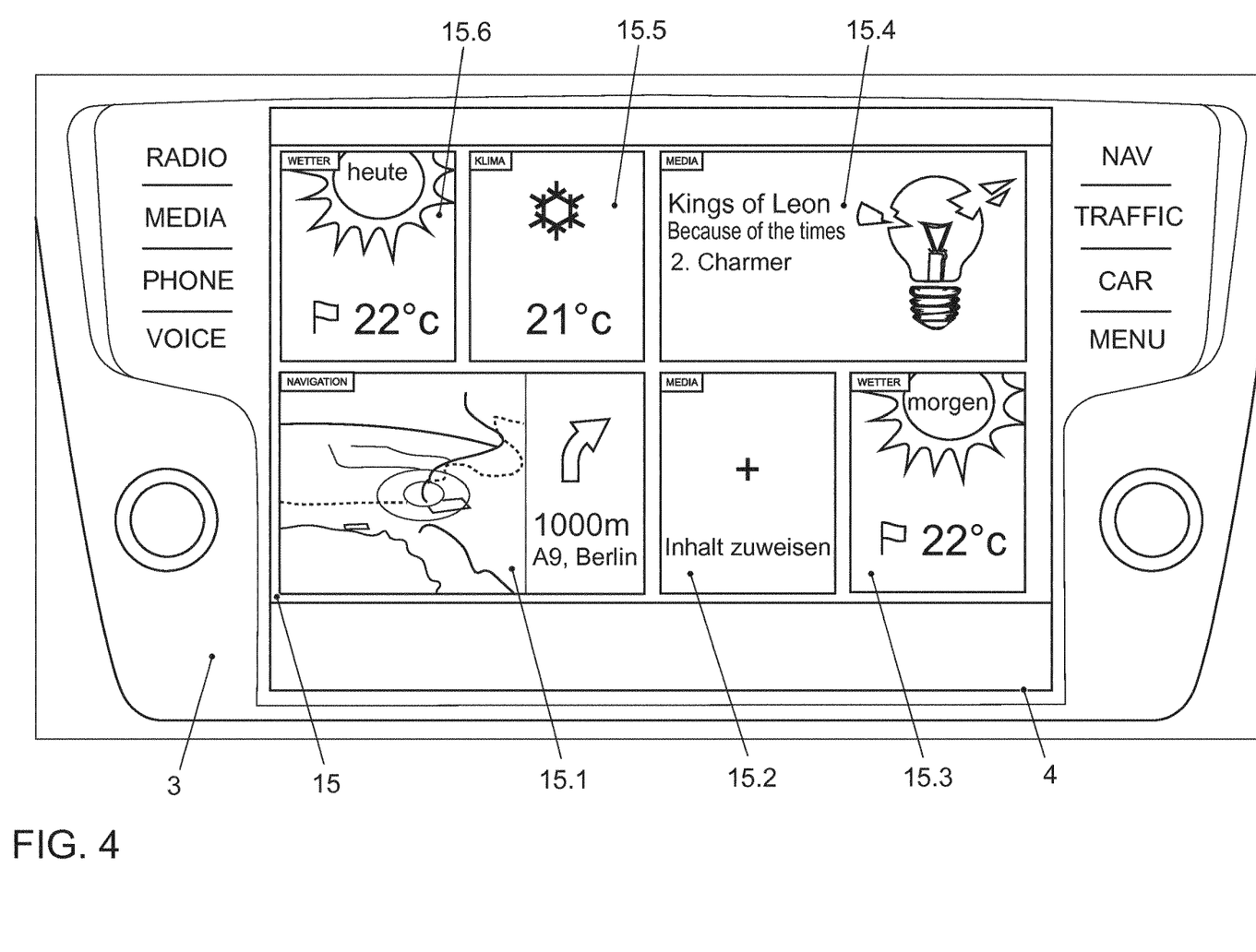
FIGS. 4 and 5 show displays as they are generated by a first exemplary embodiment of the method.

FIG. 4 shows a display on the display area before the start of the method, on which an object 15 is displayed in a first display mode.

Object 15 initially includes a first subset of total information, which is displayed in multiple graphical objects 15.1 through 15.6. The various graphical objects 15.1 through 15.6 may include information from different categories. For example, graphical object 15.1 includes navigation information, whereas no displayable information has currently been assigned to graphical object 15.2. Like graphical object 15.6 and graphical object 15.5, graphical object 15.3 includes information related to the weather or climate. Graphical object 15.4 displays the music album that is currently playing.

In step 21 of method 20, an operating intention on the part of first user N1 is detected, i.e. the driver. First user N1 has moved an operating object 7, such as his hand 7, into detection space 8 for this purpose.

In step 22, horizontal component $\alpha$ of the viewing angle of first user N1 with regard to display area 4 is ascertained.

In step 23, display area 4 is controlled such that object 15 is transferred into a second display mode. Object 15 is shown pivoted at a pivoting angle $\delta$ about an axis 16, which extends vertically through object 15 and is situated in the center of object 15, for instance. In terms of its value, pivoting angle $\delta$ corresponds to the value of horizontal component $\alpha$ of the viewing angle of first user N1 and amounts to 10°, for example. Pivoting angle $\delta$ should not exceed a value of 55° because a projection of the perspectively displayed object 15 onto display area 4 may otherwise become too small.

In particular, it is also possible to consider vertical component $\gamma$ of the viewing angle in pivoting angle $\delta$. Object 15 would then be pivoted not only about vertical axis 16, but about a horizontal axis as well.

Graphical objects 15.1 through 15.6, in particular, are also pivoted about axis 16 at pivoting angle $\delta$. In this manner, the total information included in graphical objects 15.1 through 15.6 is retained in object 15 as a whole.

Following step 23, the object is therefore shown perspectively, and the size of object 15 decreases from the right front to the left rear. This can be understood when looking at the side lengths of object 15, in particular. The first subset of the total information displayed in graphical objects 15.1 through 15.6 also decreases in size from the right front to the left rear. The size characteristic, i.e. the measure of the decrease, of object 15 and the first subset of total information 15.1 through 15.6 is a function of the size of pivoting angle $\delta$, in particular. The greater the pivoting angle $\delta$, the more extreme the size difference of object 15 between the right front and the left rear will become.

Moreover, further graphical objects 15.7 through 15.10, which belong to a second subset of the total information, are shown perspectively abutting graphical objects 15.6 and 15.1 in the rear and abutting graphical objects 15.4 and 15.3 of the first subset of the total information in the front. They adjoin graphical objects 15.1 through 15.6 without a gap. This means that the two graphical objects 15.7 and 15.8 with the information displayed therein, are objects 15.1 through 15.10 that are displayed in the largest size, whereas graphical objects 15.9 and 15.10 are graphical objects 15.1 through 15.10 that are displayed in the smallest size.

Furthermore, graphical objects 15.1 through 15.6 of the first subset are shown within two boundary lines 17 and 18. These boundary lines 17 and 18 delimit a region 19 on display area 4 in the second display mode of object 15. Any information appearing in this region and the information entering it is shown in highlighted form. For example, the first subset of the total information, i.e. graphical objects 15.1 through 15.6, may be displayed in color, while the second subset of the total information, i.e. graphical objects 15.7 through 15.10, will be shown in gray.

In other words, following step 23, object 15 displays a larger quantity of total information, which will indicate to first user N1 the total information that may be displayed to him through further operating actions.

First user N1 executes a wiping gesture directed to the left in front of display area 4 in detection space 8. This results in image scrolling, in which graphical objects are displayed in sequence, to the effect that graphical objects including information will disappear from display area 4 one after the other, and other graphical objects will be displayed on display area 4. That is to say, if first user N1 executes a wiping gesture to the left, graphical objects 15.9 and 15.10 on the left would disappear from display area 4 first, graphical objects 15.1 and 15.6 would leave region 19 at least partially toward the left, graphical objects 15.7 and 15.8 on the right would at least partially enter region 19, and graphical objects on the right adjacent to graphical objects 15.7 and 15.8 would at least partially be displayed on display area 4.

In step 24, the gesture is detected by proximity detection device 6 and is converted into a control signal, which actuates display area 4 such that all graphical objects 15.1 through 15.10 displayed in object 15 are shifted to the left rear.

In so doing, the graphical objects enter region 19 as a function of the extent of shift 15.7 and 15.8. Upon entering region 19, graphical objects 15.7 and 15.8 shown in gray will be displayed in color to the extent that they have entered region 19.

On the side of boundary line 17, graphical objects 15.6 and 15.1 simultaneously leave region 19. They will then be shown in gray to the extent that they leave region 19, once again as a function of the magnitude of the shift.

When the operating action, i.e. the wiping gesture, has ended, which is detected when operating object 7, i.e. the hand of first user N1, leaves detection space 8, object 15 changes back to the first display mode. Graphical objects 15.2 through 15.5, 15.7 and 15.8, which are located within region 19 in the second display mode, are now displayed as the first subset of the total information.

Figure 7:
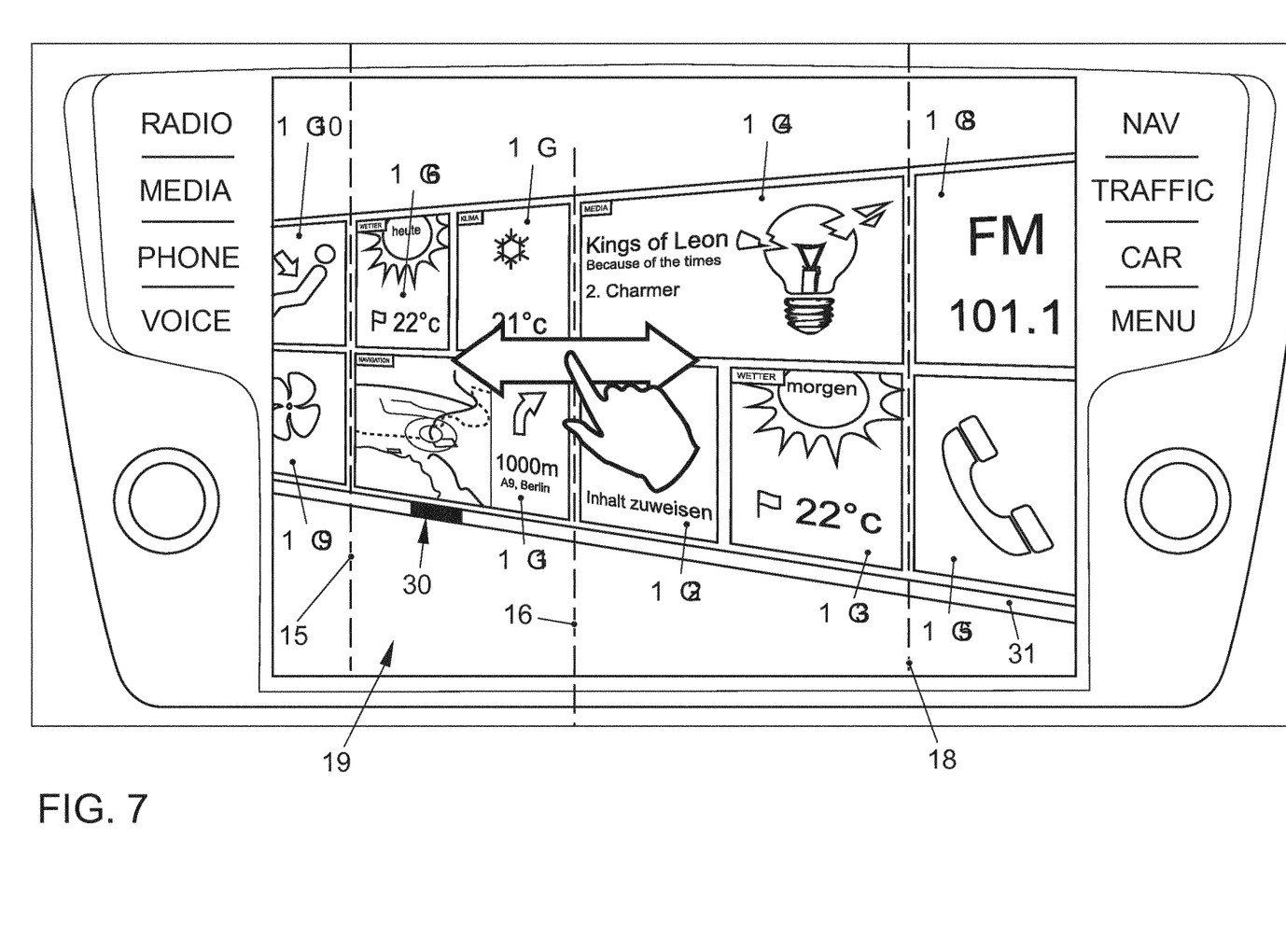
FIG. 7 shows a further display as it is able to be generated by the first exemplary embodiment of the method.

In step 23, it is additionally possible to display a bar 31 underneath object 15, which is shown in FIG. 7. Bar 31 represents the quantity of the total information. In addition, bar 31 has a marker 30, and the position of marker 30 on bar 31 informs first user N1 of the manner in which the first subset of the total information can be arranged within the quantity of the total information. This gives user N1 an indication of the quantity of the total information that is still available to him. The length of marker 30, in particular, is decisive for the amount of the quantity of the total information, because the shorter marker 30, the larger the quantity of the total information.

If a wiping gesture is executed, marker 30 on bar 31 is shifted in the direction in which the wiping gesture was executed.

Figure 8:
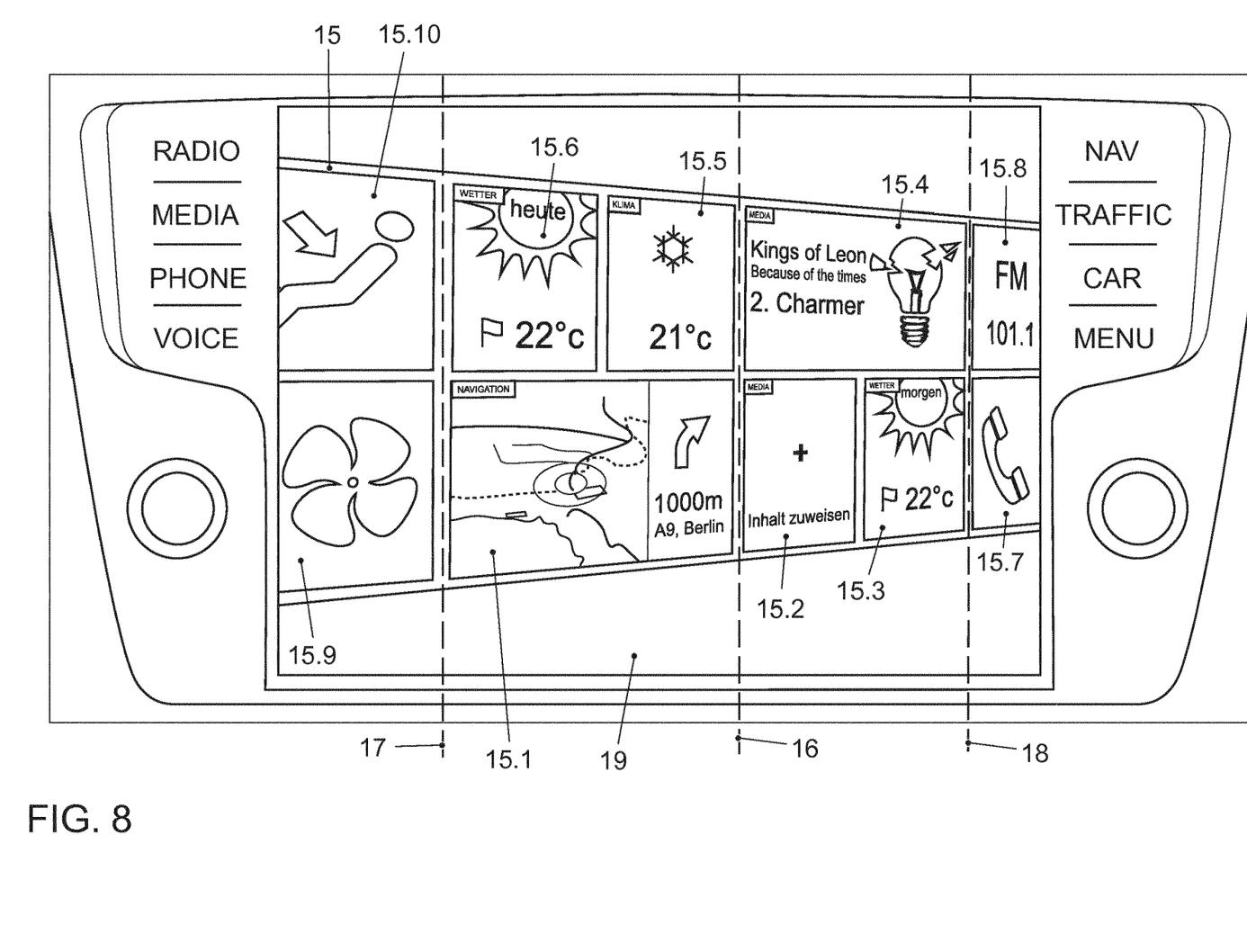
FIG. 8 shows a display as it is generated by a second exemplary embodiment of the method on the display area.

A further exemplary embodiment of the method will be discussed in the following text with reference to FIGS. 4 and 8.

Once again, the display shown in FIG. 4 forms the starting point of the method.

Second user N2 moves operating object 7, i.e. his hand, into detection space 8, which is detected by proximity detection device 6. Via electrode array 10 and ascertainment unit 6, it is determined, in particular, that the user having the operating intention is second user N2, to whom relative position P2 has been allocated. Relative position P2 is thus determined via the identification of the user having the operating intention, i.e. user N2.

The display area is controlled such that object 15 is pivoted in the direction of relative position P2, i.e. in the direction of the passenger.

Pivoting angle δ can be set in advance, so that only the direction in which object 15 will be pivoted is determined via relative positions P1 and P2. Object 15 would then be pivoted in the direction of first relative position P1 at the same pivoting angle δ as in the direction of relative position P2.

In the second exemplary embodiment of the method, an active distinction is made between driver and passenger, while in the first exemplary embodiment, a position or a viewing angle of the user having the operating intention is determined.

Both methods are also easily combinable with one another. For example, it is possible to ascertain relative positions P1 and P2 via both methods simultaneously. For instance, only pivoting of object 15 about an axis extending horizontally through the object as a function of horizontal component γ may then be dependent, while the pivoting angle about axis 16 extending vertically through object 16 is ascertained via a preset value.

If display area 4 includes a touch-sensitive surface, then operating actions may also be executed directly on the surface of display area 4.

In particular, object 15 may also be displayed in a three-dimensional view instead of a perspective view for both alternatives of the method.

LIST OF REFERENCE CHARACTERS 1 device
2 vehicle
3 display device
4 display area
5 control unit
6 detection device; proximity detection device
7 operating object
8 detection space
9 ascertainment unit
10 electrode array
11 vehicle seat
12 vertical plane
13 horizontal plane
14 center point between the eyes of a user object
15.1-15.6 graphical objects; first subset of the total information
15.7-15.10 graphical objects; second subset of the total information
16 axis
17, 18 boundaries
19 region
20 method
21-24 method steps
30 marker
31 bar
N1, N2 first user, second user
α, β horizontal component of a viewing angle
γ vertical component of a viewing angle
δ pivoting angle
B vehicle longitudinal direction

The invention claimed is:

1. A method for providing a graphical user interface in a vehicle, comprising:
   graphically displaying, on a display area in at least one first display mode, at least one object for representing a first subset of total information;
   detecting an operating intention of a user;
   ascertaining a relative position of the user with respect to the display area;
   identifying a position of one of a head and eyes of the user;
   ascertaining a viewing angle, under which the user gazes at the display area from the relative position;
   wherein the viewing angle includes a vertical component including an angle component of the viewing angle by which the gaze direction of the user deviates in a downward direction from a point on the display area to a plane situated horizontally in the vehicle longitudinal direction that intersects the eyes of the user; and
   in response to detecting the operating intention of the user, transferring the object into a second display mode, in which the object is displayed perspectively or three-dimensionally pivoted about an axis extending horizontally through the object as a function of the vertical component of the viewing angle, and about an axis extending vertically through the object as a function of a preset value in the direction of the relative position.

2. The method according to claim 1, further comprising:
   ascertaining whether a first or a second user has the operating intention; and
   determining a first relative position for the first user and a second relative position for the second user.

3. The method according to claim 1, further comprising detecting, as an operating intention, an approach of the display area by an operating object by the user.

4. The method according to claim 1, wherein in the second display mode, a second subset of the total information is shown adjacent to the first subset of the total information in the object.

5. The method according to claim 4, wherein in the second display mode, the first subset of the total information is shown in highlighted form in comparison with the second subset of the total information.

6. The method according to claim 4, wherein in the second display mode, the second subset of the total information abuts the first subset of the total information perspectively or three-dimensionally in the front and/or in the back.

7. The method according to claim 4, wherein in the second display mode, the first subset of the total information is displayed on the display area in a region that is delimited by a first boundary and a second boundary, and the first subset of the total information is shown in highlighted form in comparison with the second subset of the total information; and wherein the first subset of the total information and the second subset of the total information are shifted in their positions on the display area by an operating action of the user, a first portion of the first subset of the total information being shifted out of the region, while a second portion of the second subset of the total information is shifted into the region, so that the first portion is no longer shown in highlighted form and the second portion is displayed in highlighted form.

8. The method according to claim 1, wherein a bar having a marker is displayed, the bar representing a total quantity of the total information, and a position of the marker on the bar being shifted as a function of the operating action, the position of the marker on the bar representing the position of the first subset of the total information within the total quantity of the total information.

9. The method according to claim 1, wherein the viewing angle is ascertained in response to the detection of the operating intention.

10. A device for providing a graphical user interface in a vehicle, comprising:
   a processor;
   a memory; and
   a display device including a display area;
   wherein the processor is configured to:
      graphically display at least one object, on the display area, for representation of a first subset of total information;
      detect an operating intention of a user, a position of a head or eyes of the user, and a viewing angle, under which the user gazes at the display area from a relative position, in response to the detection of the operating intention;
      ascertain a vertical component including an angle component of the viewing angle by which the gaze direction of the user deviates in a downward direction from a point on the display area to a plane situated horizontally in the vehicle longitudinal direction that intersects the eyes of the user;
      ascertain the relative position of the user with respect to the display area; and
      generate graphical data that represent the object in a first display mode, and by which the object can be transferred into a second display mode, in which the object is displayable pivoted about an axis at a pivoting angle in a direction of the relative position and as a function of a horizontal and/or the vertical component of the viewing angle in response to detection of the operating intention.

11. The device according to claim 10, wherein the processor is further configured to detect an approach by an operating object toward the display area.

12. The device according to claim 10, wherein the processor is further configured to ascertain whether a first user or a second user has the operating intention, the first user being assigned a first relative position and the second user being assigned a second relative position.

13. A vehicle, comprising the device recited in claim 10.

* * * * *